Oct. 31, 1939.　　　　　I. PETERSON　　　　　2,178,265
HYDRAULIC SHOVEL DREDGE
Filed Sept. 21, 1938　　　4 Sheets-Sheet 2
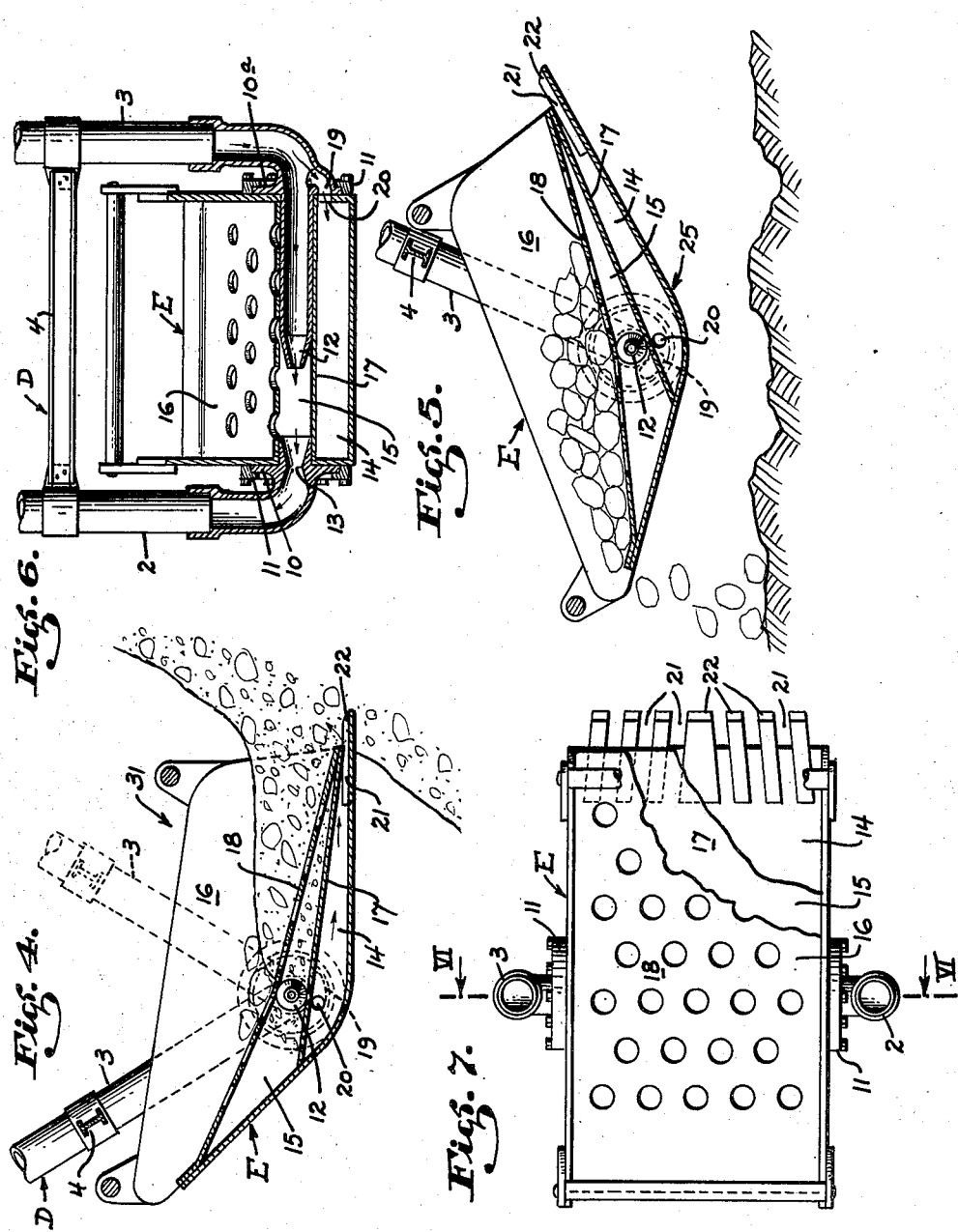
INVENTOR.
Isaac Peterson
BY
Chas. E. Townsend.
ATTORNEY.

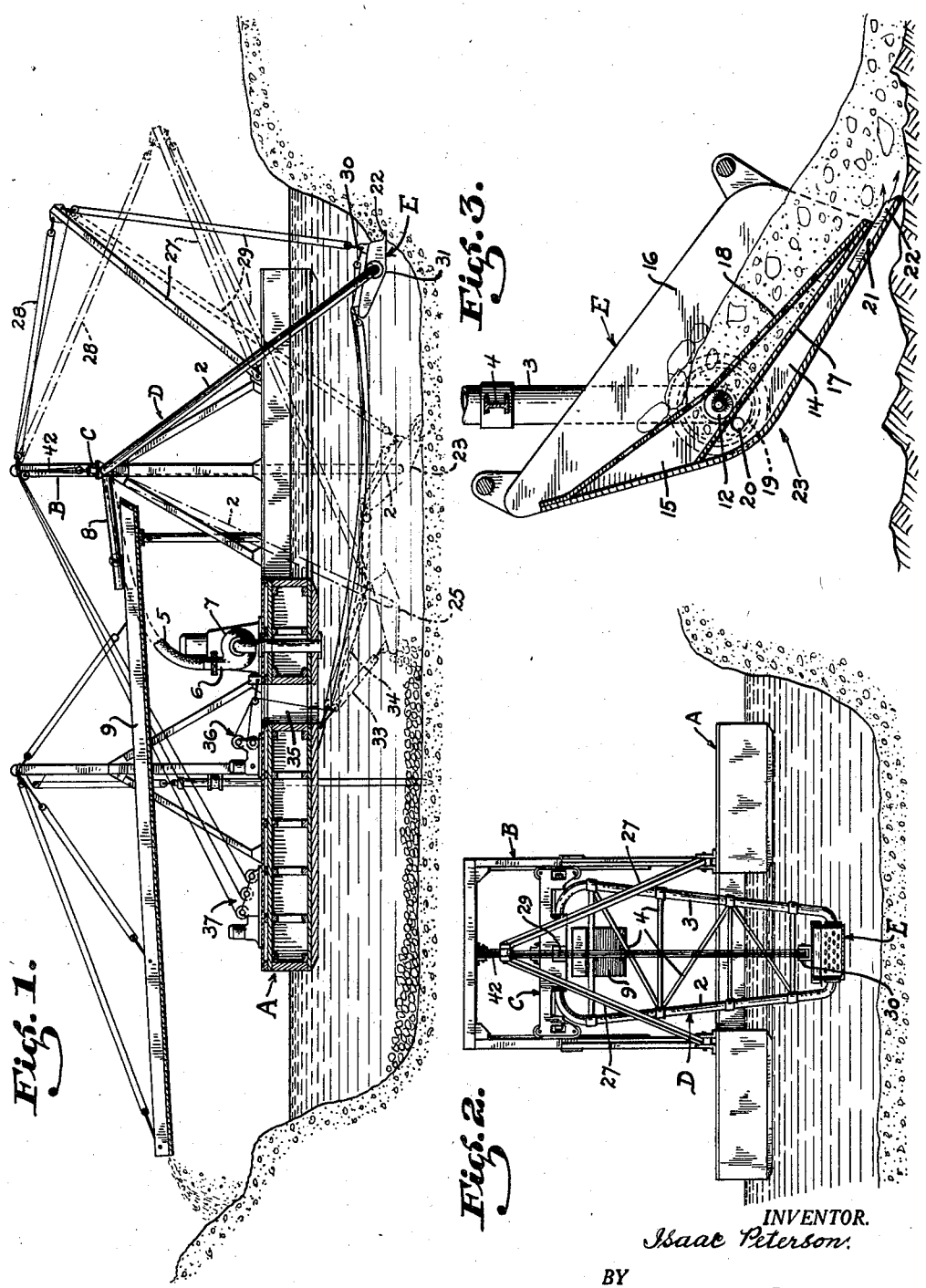

Oct. 31, 1939.  I. PETERSON  2,178,265

HYDRAULIC SHOVEL DREDGE

Filed Sept. 21, 1938   4 Sheets-Sheet 3

INVENTOR.
Isaac Peterson
BY
Chas. E. Townsend.
ATTORNEY.

Oct. 31, 1939.                I. PETERSON                 2,178,265
                         HYDRAULIC SHOVEL DREDGE
                         Filed Sept. 21, 1938      4 Sheets-Sheet 4
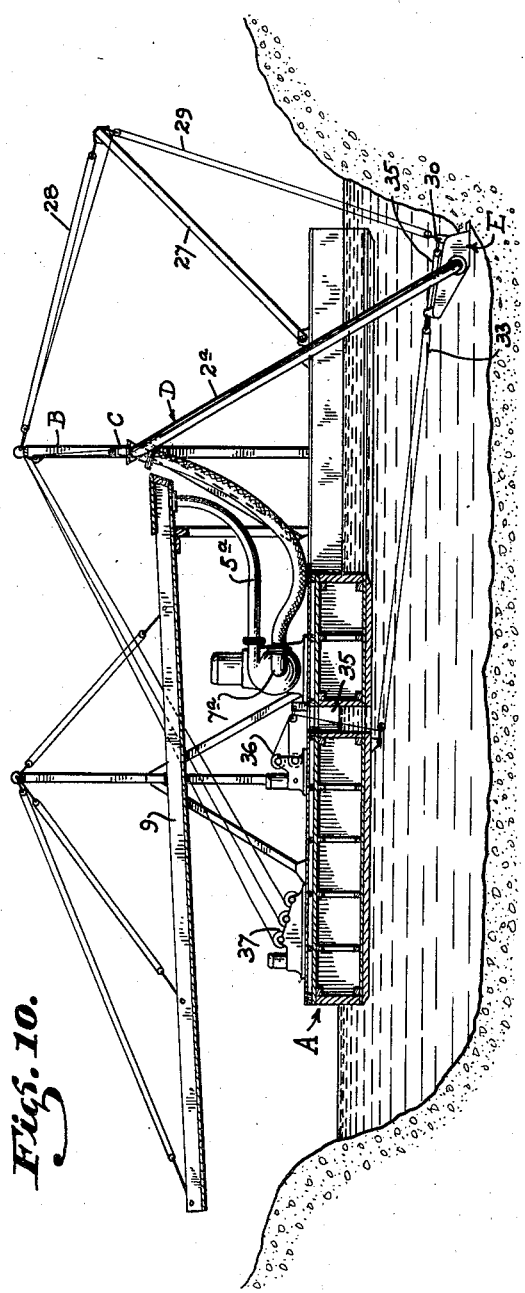
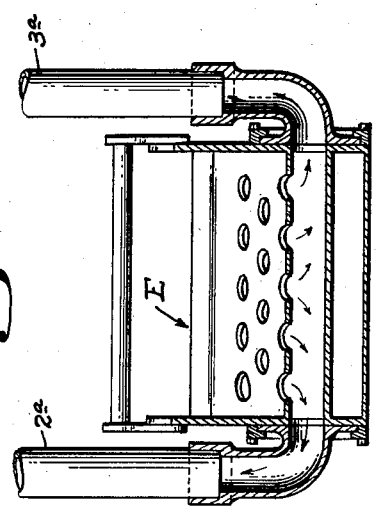
INVENTOR.
Isaac Peterson.
BY
Chas. E. Townsend.
ATTORNEY.

Patented Oct. 31, 1939

2,178,265

UNITED STATES PATENT OFFICE 2,178,265

HYDRAULIC SHOVEL DREDGE

Isaac Peterson, Oakland, Calif.

Application September 21, 1938, Serial No. 230,975

4 Claims. (Cl. 37—63)

This invention relates to a hydraulic shovel dredge particularly intended for recovering gold and other valuable minerals from river beds or from placer gravels and the like.

The object of the present invention is generally to improve and simplify the construction and operation of a hydraulic shovel dredge; to provide a shovel dredge which is adapted to float on a river or pond, and in which the shovel when working is never raised above the surface of the water; to provide a shovel from which the sand and gravel, together with the minerals contained, are continuously removed by hydraulic action and elevated to an overhead sluice or similar apparatus for the recovery of the minerals; to provide a shovel which not only functions to dig the gravel but also to screen the same, so that the sluice and elevating means are relieved of all coarse material; to provide means on the shovel for collecting the coarse gravel and larger rocks, and for periodically dumping the same; to provide means on the shovel for washing the bed rock and for directing the washed material into the shovel; to provide means operable from the deck of the dredge for tilting the shovel to assume different angular positions when digging and dumping; to provide means for visually indicating the different angular positions assumed by the shovel when digging or dumping; and further, to provide means for visually indicating the load in the shovel, to determine when dumping of the accumulated rock is necessary.

The hydraulic shovel is shown by way of illustration in the accompanying drawings, in which Fig. 1 is a side elevation of a dredge, said view being partially in section;

Fig. 2 is a front view of the same;

Fig. 3 is an enlarged longitudinal vertical section of the shovel in digging position;

Fig. 4 is a similar view showing the shovel in another digging position;

Fig. 5 is a similar view showing the shovel in a dumping position;

Fig. 6 is a cross section of the shovel taken on line VI—VI of Fig. 7;

Fig. 7 is a plan view of the shovel, partly broken away;

Fig. 10 is a side elevation in section, showing a modified form of the pump connected with the shovel; and Fig. 11 is an enlarged cross section of the shovel shown in Fig. 10.

Figure 8:
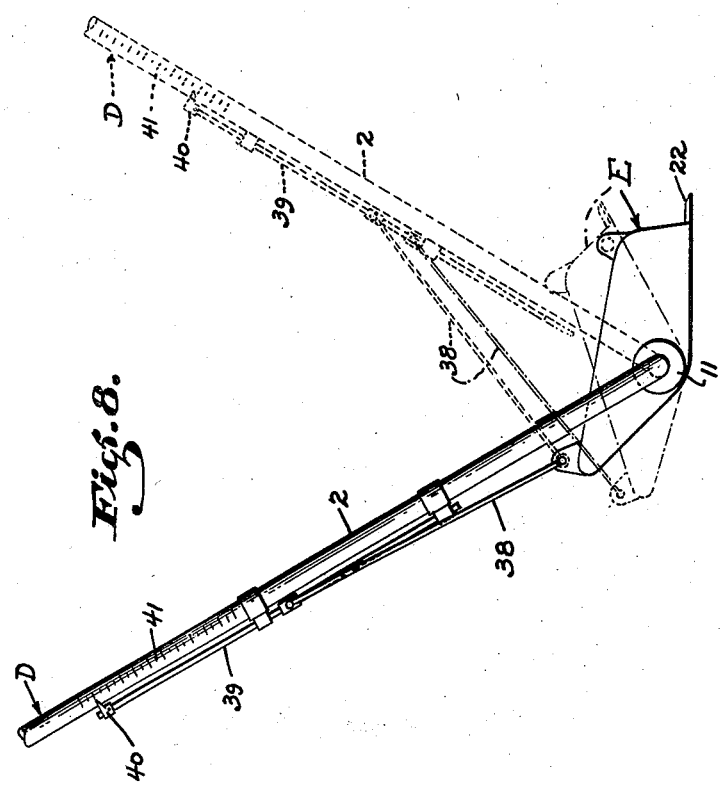
Fig. 8 is an enlarged side elevation of a portion of the shovel supporting frame, said view showing the indicator whereby the angular position of the shovel is visibly indicated.

Referring to the drawings in detail, and particularly to Figs. 1 and 2, A indicates a dredge barge or pontoon or suitable construction. Disposed near one end thereof is a gallows frame B, and mounted therein is a head frame C, from which is suspended a swinging frame D at the lower end of which is mounted a shovel E.

The frame D consists of two pipes, indicated at 2 and 3, which are cross-braced as indicated at 4 to form a frame. The upper ends of the pipes pivot on the head frame C. The pipe 3 is connected through means of a flexible hose 5 with the discharge side 6 of a centrifugal pump 7. The upper end of the pipe 2 is connected with a hose 8, and this discharges into a sluice box 9 of suitable construction. The shovel proper is swiveled or pivotally mounted between the lower ends of the pipes 2 and 3, as best illustrated in Fig. 6. That is, the lower ends of the pipes 2 and 3 terminate in flanges 10 which are free to rotate in head members 11 secured to the opposite sides of the shovel. Pipe 3 terminates in a nozzle 12, and the discharge of the nozzle passes crosswise of the shovel into the Venturi-shaped end 13 of pipe 2. A suction is thus produced, the function of which will hereinafter be described.

The shovel proper is divided into three compartments; a lowermost compartment 14, an intermediate compartment 15, and an upper compartment 16. The compartments 14 and 15 are separated by an intermediate plate 17, and the compartments 15 and 16 by a perforated screening plate 18. The flange 10a formed at the lower end of the pipe 3 has an elongated port 19 formed therein. The adjacent side wall of the shovel has a port 20 formed therein, and when the two ports register, water under pressure will enter the lower compartment 14 and will discharge through the forward end thereof, as an elongated slot or opening is formed at 21. Digging teeth 22 are also mounted at this point. Water under pressure is discharged through the slot between the teeth 22 when the shovel assumes the position shown in dotted lines at 23 (see Fig. 1), and that is for the purpose of washing the bedrock and for forcing any gold or minerals remaining thereon in a direction in front of the shovel, so that the teeth can scoop it up and deliver it into the shovel. The washing action of the water under pressure is also indicated in Fig. 3. The nozzle 12 and the cooperating Venturi tube 13 are mounted in the compartment 15; hence produce a suction action in the compartment so that when the shovel is being pulled ahead into a bank of gravel the gravel will be deposited on top of the screen 18, and as there is a suction action in the compartment 15, water will be sucked through the gravel, and the fine gravel, sand and minerals will thus enter the compartment 15 and will then be lifted by the hydraulic action of the nozzle up through the pipe 2 and through the hose 8 into the sluice box. The coarser gravel and rocks will remain on the screen 18 and will there accumulate, and when a sufficient quantity of material is accumulated, the shovel will be pulled back to the dotted line position shown at 25 in Fig. 1, where the shovel will be tilted and the rock dumped.

The shovel has two movements: first of all, it moves with the frame D when this is swung about its pivotal support or head frame C; and it has a second movement, to wit, that of assuming different digging and dumping angles between the lower ends of the frame D. In order to pull the frame in a forward direction when the shovel is digging, a boom 27 is provided. The angular position of the boom may be adjusted by cables 28. Also attached to the boom are cables 29; these are connected as at 30 to the forward end of the shovel, and it may thus be pulled forward from the dotted line position shown at 25 to the full line position shown at 31 (see Fig. 1). In order to tilt the shovel between the lower ends of the pipes 2 and 3, cables such as indicated at 33 and 34 are provided. These cables extend through a well 35 formed in the barge, and are connected with winches or other similar means, indicated at 36. The cables 28 and 29 are similarly extended to winches such as shown at 37, and as such are within control of the operator at all times.

In actual practice, it should be realized that when the shovel is operating on a dredge pond or the like, the water will be so muddy that it will be impossible to see just what position the shovel is assuming when digging, dumping, etc. To determine this, means are provided for visually indicating the position of the shovel. This is best shown in Fig. 8. To the rear end of the shovel is pivotally attached a link 38. This is in turn connected to a sliding rod 39 mounted on one of the pipes, for instance that indicated at 2. The upper end of the rod is provided with a finger 40, and this moves over a scale, shown at 41. The rod 39 extends up to a point above deck level, and as such can at all times be seen by the operator; thus by the position of the finger or indicator 40 with relation to the scale, the angular position of the shovel may at all times be determined.

Figure 9:
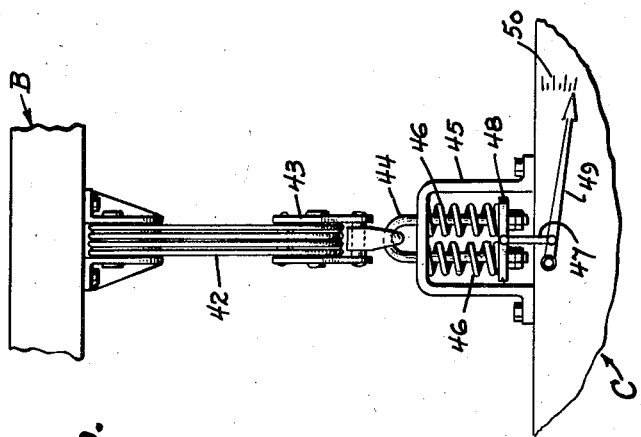
Fig. 9 is an enlarged view of a portion of the head frame and the resilient connection between the same and the lifting tackle, said view also showing the weight-indicating mechanism.

Means are also provided for determining the quantity of rock or coarse material accumulating on the screen 18 of the shovel. This means is best illustrated in Fig. 9. The head frame C is suspended from the overhead gallows frame B by cables 42. The lower block 43 is connected by a U-bolt 44. This passes through a yoke 45 secured to the head frame, and springs 46 are interposed between the lower ends of the U-bolt and the upper end of the yoke; in other words, a spring or resilient connection is formed between the lifting tackle and the head frame C, and as the head frame supports the frame D and the shovel E, any increase of load on the shovel will cause compression of the springs 46. A link 47 is connected with a plate 48. The link is in turn connected with a pointer 49 moving over a scale 50, and as this is within view of the operator, the position of the pointer with relation to the scale will indicate when the shovel is loaded with coarse rock and similar material, so that the shovel may be pulled rearwardly and dumped, as indicated at 25 (see Fig. 1), whenever necessary.

In the present instance, I have shown a hydraulic lift for producing a suction action in the compartment 15 of the shovel, and for elevating the sand and gravel, but while this may be preferable, I nevertheless wish it understood that both pipes may be connected with the suction side of the pump 7a (see Fig. 10), and as such will pass therethrough and will then be discharged through the hose 5a into the sluice box. Whether one form of suction lift or another is used, will depend entirely upon the character of the minerals contained in the gravel being handled. The shovel shown in Figs. 10 and 11 is particularly intended for removing sand and gravel and for washing the same; i. e., sand and gravel which are to be used for road and building purposes, etc. Suction alone is sufficient to elevate the material to the sluice, and this in turn may deliver the material to a barge, or pile it behind the dredge. The pump 7a will be provided with a suction connection on each side, and will be connected to both pipes 2a and 3a.

While certain other features of my invention have been more or less specifically described and illustrated, I nevertheless wish it understood that changes may be resorted to within the scope of the appended claims, and that the specific materials and finish employed may be according to the wishes of the manufacturer or to conditions of use.

Having thus described and illustrated my invention, what I claim and desire to secure by Letters Patent is

1. A shovel of the character described having a bottom section, a rear end and sides, said shovel being divided into an upper, a lower and an intermediate compartment, a perforated plate interposed between the upper and intermediate compartments and forming a gravel screen, means for maintaining a suction in the intermediate compartment to cause water to pass through gravel deposited upon the perforated plate so as to wash the gravel and cause all gravel except coarse material to pass through the perforations and to enter the intermediate compartment, said suction means also removing the gravel entering the intermediate compartment, and means for delivering water under pressure to the lower compartment and for discharging it through the forward end thereof.

2. In a barge floated dredge a gallows frame, a pair of tubular arms pivotally attached at their upper ends to the frame and having their lower ends extending below the barge, a shovel pivotally mounted between the lower ends of the arms, said shovel having a suction compartment formed therein and said suction compartment being in communication with the lower ends of the tubular arms, a perforated plate covering the suction compartment and forming a gravel screen, a hydraulic nozzle in the suction compartment, supplied with water under pressure from one of the tubular arms, and the other tubular arm functioning as a discharge pipe, said nozzle maintaining a suction in the suction compartment to cause water to pass through gravel deposited upon the gravel screen so as to wash the gravel and cause all gravel except coarse material to pass through the screen into the suction compartment and to be discharged into the discharge pipe.

3. In a barge floated dredge a gallows frame, a pair of tubular arms pivotally attached at their upper ends to the frame and having their lower ends extending below the barge, a shovel pivotally mounted between the lower ends of the arms, said shovel having a suction compartment formed therein and said suction compartment being in communication with the lower ends of the tubular arms, a perforated plate covering the suction compartment and forming a gravel screen, a hydraulic nozzle in the suction compartment, supplied with water under pressure from one of the tubular arms, and the other tubular arm functioning as a discharge pipe, said nozzle maintaining a suction in the suction compartment to cause water to pass through gravel deposited upon the gravel screen so as to wash the gravel and cause all gravel except coarse material to pass through the screen into the suction compartment and to be discharged into the discharge pipe, a pressure compartment formed in the shovel below the suction compartment, means for by-passing a portion of the water under pressure delivered to the nozzle to said pressure compartment, a plurality of digging teeth at one end of the shovel, and means for directing the water from the pressure compartment to a point adjacent the digging teeth to wash bedrock when the shovel is digging.

4. In a barge floated dredge a gallows frame, a pair of tubular arms pivotally attached at their upper ends to the frame and having their lower ends extending below the barge, a shovel pivotally mounted between the lower ends of the arms, said shovel having a suction compartment formed therein and said suction compartment being in communication with the lower ends of the tubular arms, a perforated plate covering the suction compartment and forming a gravel screen, a hydraulic nozzle in the suction compartment, supplied with water under pressure from one of the tubular arms, and the other tubular arm functioning as a discharge pipe, said nozzle maintaining a suction in the suction compartment to cause water to pass through gravel deposited upon the gravel screen so as to wash the gravel and cause all gravel except coarse material to pass through the screen into the suction compartment and to be discharged into the discharge pipe, a pressure compartment formed in the shovel below the suction compartment, means for by-passing a portion of the water under pressure delivered to the nozzle to said pressure compartment, a plurality of digging teeth at one end of the shovel, means for directing the water from the pressure compartment to a point adjacent the digging teeth to wash bedrock when the shovel is digging, means for tilting the shovel from a digging position to a coarse material dumping position, and means for cutting off the supply of water to the pressure compartment when the shovel assumes a dumping position.

ISAAC PETERSON.